US011728611B2

(12) United States Patent
Ahmadi et al.

(10) Patent No.: US 11,728,611 B2
(45) Date of Patent: Aug. 15, 2023

(54) ISOTHERMAL ENCLOSURE WITH OPTICAL APERTURE

(71) Applicant: Lumentum Operations LLC, San Jose, CA (US)

(72) Inventors: Roozbeh Ahmadi, Ottawa (CA); Nenad Duricic, Ottawa (CA); Doug Cross, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 820 days.

(21) Appl. No.: 16/712,493

(22) Filed: Dec. 12, 2019

(65) Prior Publication Data

US 2021/0063685 A1    Mar. 4, 2021

Related U.S. Application Data

(60) Provisional application No. 62/895,848, filed on Sep. 4, 2019, provisional application No. 62/895,850, filed on Sep. 4, 2019.

(51) Int. Cl.
| | |
|---|---|
| *H01S 3/04* | (2006.01) |
| *G01S 7/481* | (2006.01) |
| *H01S 3/02* | (2006.01) |
| *G02B 7/18* | (2021.01) |
| *F25B 29/00* | (2006.01) |

(52) U.S. Cl.
CPC ............ *H01S 3/0405* (2013.01); *F25B 29/00* (2013.01); *G01S 7/4813* (2013.01); *G02B 7/1815* (2013.01); *H01S 3/025* (2013.01)

(58) Field of Classification Search
None
See application file for complete search history.

(56) References Cited

U.S. PATENT DOCUMENTS

| | | | |
|---|---|---|---|
| 2003/0095346 A1* | 5/2003 | Nasu ................... | G02B 6/4208 359/820 |
| 2007/0013989 A1* | 1/2007 | Lim ...................... | G02B 26/12 359/198.1 |
| 2007/0200064 A1* | 8/2007 | Remillard .............. | G02B 23/12 250/330 |
| 2010/0208244 A1* | 8/2010 | Earhart ................. | G01S 17/894 356/139.01 |
| 2014/0072004 A1* | 3/2014 | Connolly .............. | H01S 3/0405 372/34 |

(Continued)

FOREIGN PATENT DOCUMENTS

DE    102010032726 B3 * 11/2011    ........... G01C 15/002

OTHER PUBLICATIONS

LeddarTech Inc, https://leddartech.com/lidar/leddar-vu8-solid-state-lidar-sensor-module/, retrieved Dec. 12, 2019, 3 pages.

*Primary Examiner* — Eric L Bolda
(74) *Attorney, Agent, or Firm* — Harrity & Harrity, LLP

(57) ABSTRACT

An optical device may include an enclosure including an optical aperture and a plurality of optical components positioned within the enclosure, where the plurality of optical components are to emit and/or receive light through the optical aperture. The optical device may include at least one heating element or cooling element to provide an isothermal environment to the plurality of optical components, where the at least one heating element or cooling element is thermally coupled with the enclosure.

20 Claims, 13 Drawing Sheets

(56) References Cited

U.S. PATENT DOCUMENTS

| | | | |
|---|---|---|---|
| 2016/0229618 A1* | 8/2016 | Savic | B65D 43/0202 |
| 2018/0176524 A1* | 6/2018 | Kobori | G02B 27/0101 |
| 2020/0072582 A1* | 3/2020 | Factor | G02B 27/0927 |
| 2020/0239297 A1* | 7/2020 | Yamada | B81B 7/0006 |

* cited by examiner

US 11,728,611 B2

ISOTHERMAL ENCLOSURE WITH OPTICAL APERTURE

RELATED APPLICATIONS

This application claims priority to U.S. Provisional Patent Application No. 62/895,848 for a "Thermal Enclosure with a Wide Optical Aperture," filed on Sep. 4, 2019, the content of which is incorporated by reference herein in its entirety.

This application claims priority to U.S. Provisional Patent Application No. 62/895,850 for a "Solid-State Lidar with Triple-Enclosure Packaging," filed on Sep. 4, 2019, the content of which is incorporated by reference herein in its entirety.

TECHNICAL FIELD

The present disclosure relates generally to enclosures for optical sub-assemblies and, more particularly, to an isothermal enclosure with an optical aperture to permit an optical sub-assembly to optically communicate with an environment outside of the isothermal enclosure.

BACKGROUND

An optics block, such as a wavelength selective switching (WSS) optics block, a light detection and ranging (lidar) optics block, and/or the like, may include one or more optical components arranged to guide light, such as a laser beam. For example, a lidar optics block may include a laser source, one or more lenses, one or more mirrors, and/or the like.

SUMMARY

According to some possible implementations, an optical device may include a first enclosure including a first optical aperture; a plurality of optical components positioned within the first enclosure; a second enclosure including a second optical aperture, wherein the first enclosure is positioned within the second enclosure, and wherein the first enclosure is an isothermal enclosure and the second enclosure is a hermetically-sealed enclosure, or the first enclosure is the hermetically-sealed enclosure and the second enclosure is the isothermal enclosure; at least one heating element or cooling element to provide an isothermal environment to the plurality of optical components, wherein the at least one heating element or cooling element is thermally coupled with the isothermal enclosure; and a thermally-insulating enclosure including a third optical aperture, wherein the first enclosure and the second enclosure are positioned within the thermally-insulating enclosure; and wherein the plurality of optical components are to emit and/or receive light through the first optical aperture, the second optical aperture, and the third optical aperture.

According to some possible implementations, an optical device may include a hermetically-sealed enclosure including an optical aperture; a plurality of optical components positioned within the hermetically-sealed enclosure, wherein the plurality of optical components include a laser component to emit an optical beam and a scanning component to scan a field of view with the optical beam through the optical aperture; and at least one heating element or cooling element to provide an isothermal environment to the plurality of optical components, wherein the at least one heating element or cooling element is positioned within the hermetically-sealed enclosure.

According to some possible implementations, an optical device may include an enclosure including an optical aperture; a plurality of optical components positioned within the enclosure, wherein the plurality of optical components are to emit and/or receive light through the optical aperture; and at least one heating element or cooling element to provide an isothermal environment to the plurality of optical components, wherein the at least one heating element or cooling element is thermally coupled with the enclosure.

DETAILED DESCRIPTION

Figure 1:
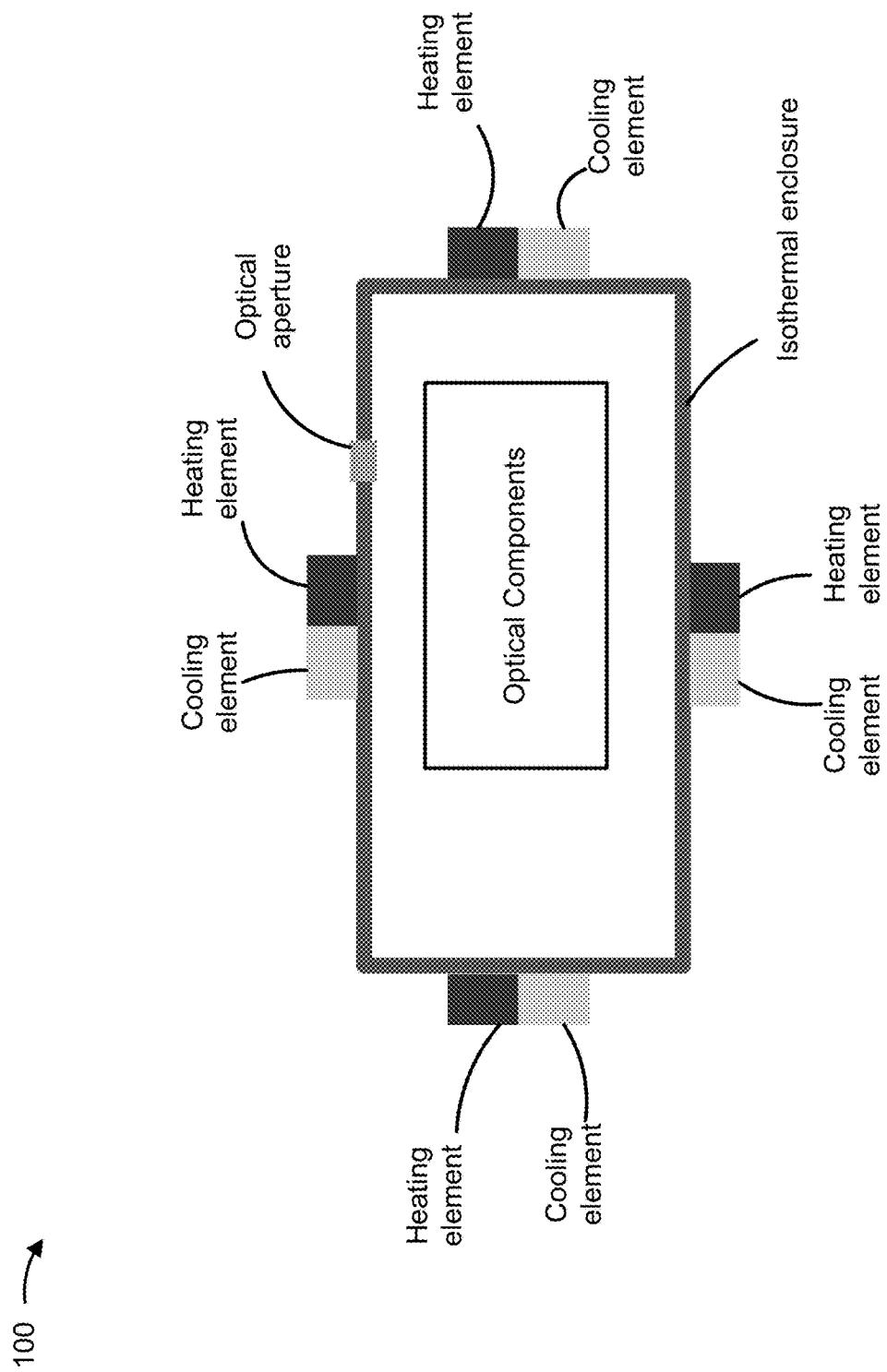
FIGS. 1-4 are diagrams of one or more example optical devices including isothermal enclosures as described herein.

The following detailed description of example implementations refers to the accompanying drawings. The same reference numbers in different drawings may identify the same or similar elements.

Optics blocks may include one or more optical components arranged on an optomechanical bench, and a lid forming an enclosure to minimize physical movement of the optical components, thermally regulate and/or insulate the optical components, prevent gases and/or dust from affecting the optical components or the performance of the optical components, and/or the like. For example, a WSS optics block may include an isothermal enclosure that maintains a relatively uniform temperature of the optical components (e.g., using a heater positioned on the exterior of the isothermal enclosure) regardless of an external ambient temperature. The optical components of the WSS optics block may be optically connected to an external environment (e.g., external to the thermal enclosure) via optical fibers.

However, some optics blocks, to perform properly, must optically communicate (e.g., emit and/or receive light) with an external environment over a wider field of view than can be achieved using optical fibers. For example, a lidar optics block may include a scanning mirror for scanning a laser beam across a field of view external to the lidar optics block, in which case a wider field of view may improve performance. Achieving a larger field of view for optical communication may require a larger discontinuity in the enclosure of the optics block. However, a large discontinuity (e.g., made of a material with low thermal conductivity, such as glass) in an isothermal enclosure may compromise the effectiveness or the functionality of the isothermal enclosure. In other words, as a size of a discontinuity in the isothermal enclosure increases, a temperature uniformity inside the isothermal enclosure decreases.

Some implementations described herein provide an optical device that may include an enclosure including an optical aperture, a plurality of optical components positioned within the enclosure, where the plurality of optical components are to emit and/or receive light through the optical aperture, and at least one heating element or cooling element to provide an isothermal environment to the plurality of optical components, where the at least one heating element or cooling element is positioned within the enclosure. For example, the plurality of optical components may include a laser component to emit an optical beam and a scanning component to scan a field of view with the optical beam through the optical aperture. In some implementations, the enclosure may include an optomechanical bench and a lid, where the optical aperture is positioned in the lid. In some implementations, the enclosure may be hermetically sealed.

Some implementations described herein provide an optical device that may include a first enclosure including a first optical aperture, a plurality of optical components positioned within the first enclosure, where the plurality of optical components are to emit and/or receive light through the first optical aperture, and a second enclosure including a second optical aperture, where the first enclosure is positioned within the second enclosure. In some implementations, the first enclosure is an isothermal enclosure and the second enclosure is a hermetically-sealed enclosure. In some implementations, the first enclosure is the hermetically-sealed enclosure and the second enclosure is the isothermal enclosure. In some implementations, the optical device may include at least one heating element or cooling element to provide an isothermal environment to the plurality of optical components, where the at least one heating element or cooling element is thermally coupled with the isothermal enclosure. In some implementations, the optical device may include a thermally-insulating enclosure including a third optical aperture, where the first enclosure and the second enclosure are positioned within the thermally-insulating enclosure.

In this way, the optical device may include an enclosure having an optical aperture permitting optical components within the enclosure to optically communicate with an external environment, while maintaining the effectiveness or the functionality of the isothermal enclosure. Additionally, or alternatively, the optical device may include multiple enclosures with optical apertures permitting optical components within the enclosure to optically communicate with an external environment, while minimizing physical movement of the optical components, thermally regulating and/or insulating the optical components, preventing gases and/or dust from affecting the optical components or the performance of the optical components, and/or the like.

FIG. 1 is a diagram of an example optical device 100 including an isothermal enclosure as described herein. As shown in FIG. 1, the optical device 100 may include an isothermal enclosure including an optical aperture, optical components positioned within the isothermal enclosure, and a plurality of heating and/or cooling elements positioned on the exterior of the isothermal enclosure.

In some implementations, the optical aperture of the optical device 100 may be small (e.g., less than about 5% of a surface area of an upper surface of the isothermal enclosure) and may produce small temperature gradients within the isothermal enclosure with respect to the optical components. Thus, in conjunction with the isothermal enclosure, the plurality of heating and cooling elements positioned on the exterior of the isothermal enclosure may provide an isothermal environment to the plurality of optical components and/or within the enclosure.

Figure 2:
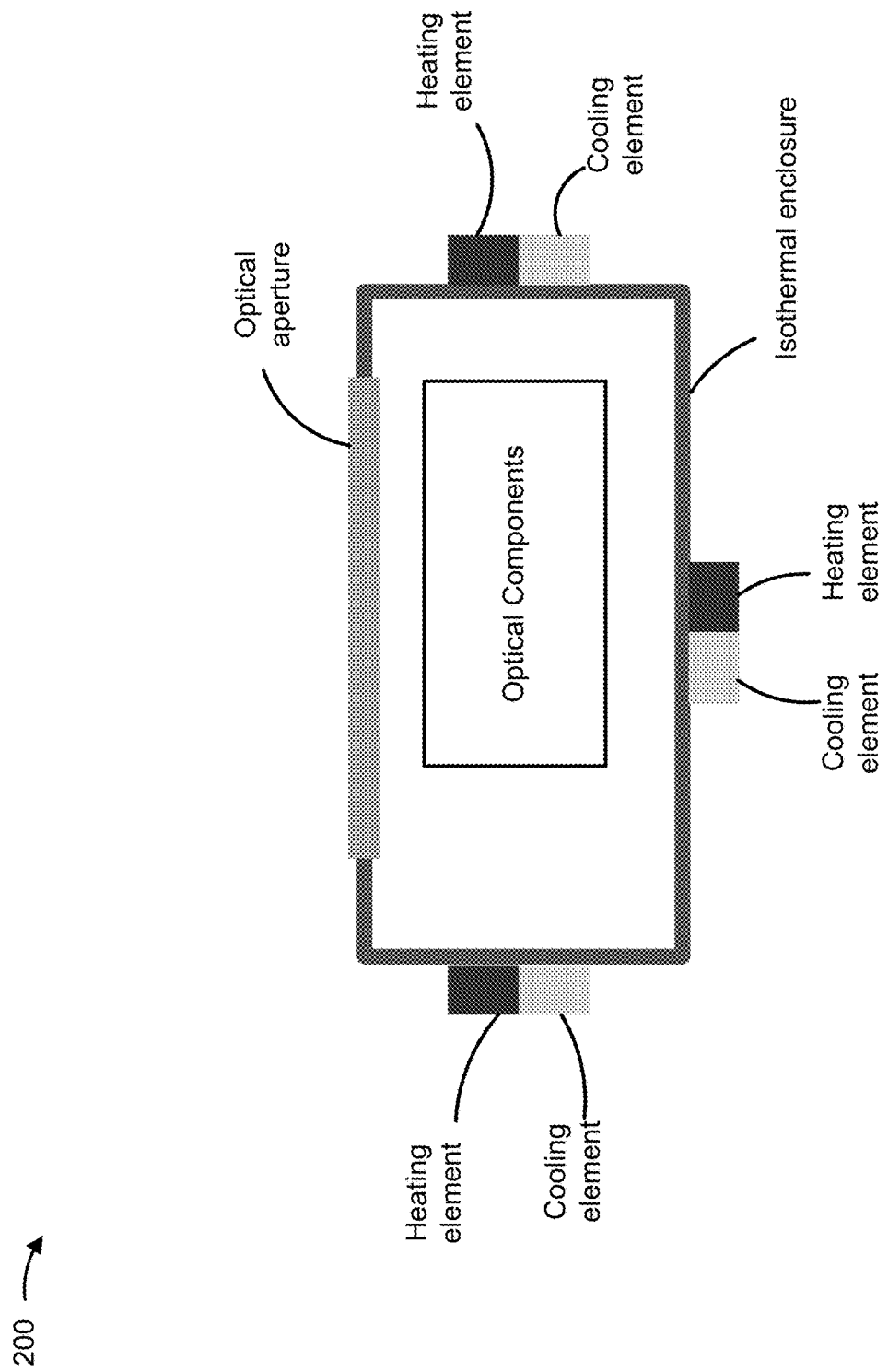

FIG. 2 is a diagram of an example optical device 200 including an isothermal enclosure as described herein. As shown in FIG. 2, the optical device 200 may include an isothermal enclosure including an optical aperture, optical components positioned within the isothermal enclosure, and a plurality of heating and cooling elements positioned on the exterior of the isothermal enclosure.

In some implementations, the optical aperture of the optical device 200 may be large (e.g., more than about 5% of a surface area of an upper surface of the isothermal enclosure) and may produce large temperature gradients within the thermal enclosure with respect to the optical components. Thus, the plurality of heating and cooling elements positioned on the exterior of the isothermal enclosure may not provide an isothermal environment to the plurality of optical components and/or within the enclosure. For example, the large temperature gradient produced by the optical aperture may prevent the plurality of heating and cooling elements from providing an isothermal environment to the plurality of optical components and/or within the enclosure. Additionally, or alternatively, the optical aperture may not permit proper positioning of heating and cooling elements and/or positioning of an appropriate number of heating and cooling elements on the exterior of the isothermal enclosure to provide an isothermal environment to the plurality of optical components and/or within the enclosure.

Figure 3:
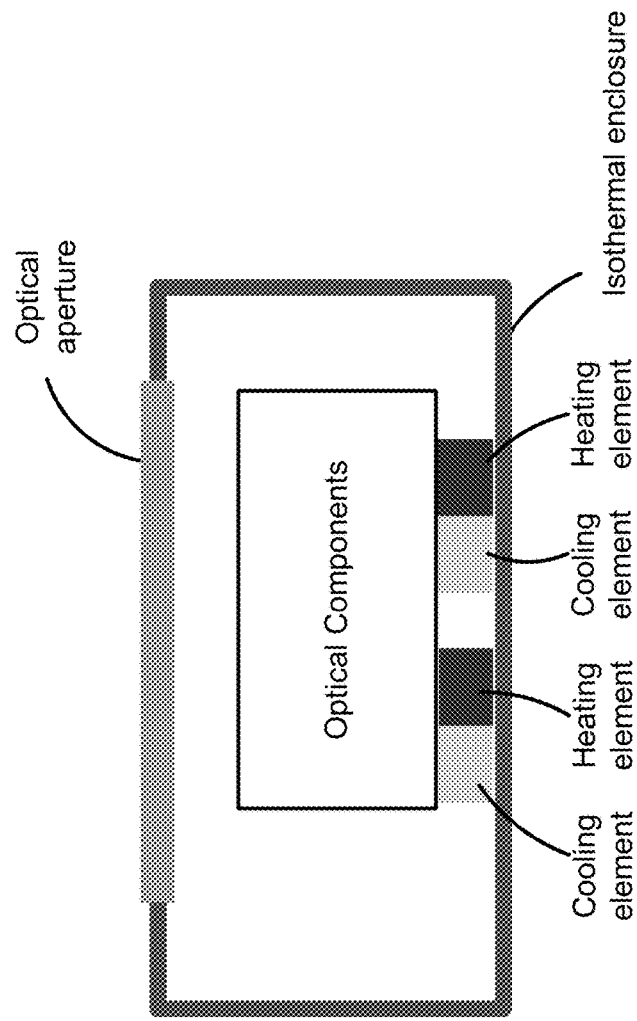

FIG. 3 is a diagram of an example optical device 300 including an isothermal enclosure as described herein. As shown in FIG. 3, the optical device 300 may include an isothermal enclosure including an optical aperture, optical components positioned within the isothermal enclosure, and a plurality of heating and cooling elements positioned within the isothermal enclosure.

In some implementations, the isothermal enclosure may include an optomechanical bench and a lid. For example, the optomechanical bench may include a bottom wall and side walls extending vertically upward from the bottom wall. In some implementations, the lid may include the optical aperture. In some implementations, the isothermal enclosure (e.g., the optomechanical bench, the bottom wall, the side walls, the lid, and/or the like) may be made of a metal (e.g., aluminum, aluminum alloy, copper, and/or the like), ceramics (e.g., aluminum nitride and/or the like), and/or the like. In some implementations, the isothermal enclosure may be made of a material with a high thermal conductivity, such as at least 100 W/(m*K), 171 W/(m*K), 210 W/(m*K), 220 W/(m*K), 385 W/(m*K), and/or the like.

In some implementations, the optical aperture may cover at least 10%, 20%, 30%, 40%, 50%, 60%, 70%, 80%, or 90% of an area of a wall of the isothermal enclosure. For example, the optical aperture may cover between about ten and twenty percent of an area of an upward facing wall of the isothermal enclosure and may be embedded in the isothermal enclosure.

In some implementations, the optical aperture may have a lower thermal conductivity than the isothermal enclosure. In some implementations, the optical aperture may be made of a material with a low thermal conductivity, such as less than 10 W/(m*K), 1 W/(m*K), 0.2 W/(m*K), and/or the like. For example, the optical aperture may be made of glass (e.g., sapphire glass), a transparent epoxy, a polymer, and/or the like. In some implementations, the optical aperture may be made of a material having a thermal conductivity that is less than a tenth of the thermal conductivity of the isothermal enclosure.

In some implementations, the optical aperture of the isothermal enclosure may produce temperature gradients within the thermal enclosure with respect to the optical components. However, the plurality of heating and cooling elements may be positioned within the isothermal enclosure such that the plurality of heating and cooling elements may provide an isothermal environment to the plurality of optical components and/or within the isothermal enclosure. For example, the plurality of heating and cooling elements may be positioned proximate the plurality of optical components such that the plurality of heating and cooling elements may counteract the temperature gradients produced by the optical aperture to provide an isothermal environment to the plurality of optical components.

In some implementations, the plurality of heating and cooling elements may provide an isothermal environment to a portion of the interior of the isothermal enclosure in which the plurality of optical components is positioned. For example, the plurality of heating and cooling elements may not provide an isothermal environment to the complete interior of the isothermal enclosure (e.g., due to temperate gradients produced by the optical aperture and/or the like) and may provide an isothermal environment to a volume of the isothermal enclosure in which the plurality of optical components are positioned. In this way, the optical device 300 may conserve energy that would otherwise be consumed by providing enough energy to the plurality of heating and cooling elements to provide an isothermal environment to the complete interior of the isothermal enclosure.

In some implementations, the plurality of heating and cooling elements may be positioned within the isothermal enclosure to provide an in-plane isothermal environment to the plurality of optical components. For example, if the plurality of optical components require an in-plane temperature uniformity, the plurality of heating and cooling elements may be positioned on vertical walls of the isothermal enclosure to provide the in-plane isothermal environment to the plurality of optical components.

In some implementations, the plurality of heating and cooling elements may be positioned within the isothermal enclosure to provide a vertically isothermal environment to the plurality of optical components. For example, if the plurality of optical components require a vertical temperature uniformity, the plurality of heating and cooling elements may be positioned above and/or below the plurality of optical components to provide the vertically isothermal environment to the plurality of optical components.

In some implementations, the plurality of heating and cooling elements may be positioned within the isothermal enclosure to provide an in-plane and vertically isothermal environment to the plurality of optical components. For example, if the plurality of optical components require an in-plane and vertical temperature uniformity, the plurality of heating and cooling elements may be positioned on vertical walls of the isothermal enclosure and above and/or below the plurality of optical components to provide the in-plane and vertically isothermal environment to the plurality of optical components.

Additionally, or alternatively, the plurality of heating and cooling elements may be positioned within the isothermal enclosure, on the exterior of the isothermal enclosure, and/or within and on the exterior of the isothermal enclosure to provide an isothermal environment to the plurality of optical components. For example, a first set of heating and cooling elements may be positioned within the isothermal enclosure and a second set of heating and cooling elements may be positioned on the exterior of the isothermal enclosure due to space constraints, optical component sizes, to achieve a particular shape and/or volume of the isothermal environment, and/or the like. In some implementations, the plurality of heating and cooling elements may be thermally coupled to the isothermal enclosure to provide the isothermal environment.

In some implementations, the optical device 300 may include a heating and/or cooling element positioned within the isothermal enclosure and/or on the isothermal enclosure to offset a temperature gradient produced by an optical component within the isothermal enclosure. For example, the optical device 300 may include a cooling element positioned within the isothermal enclosure and/or on the isothermal enclosure to offset a temperature gradient produced by a laser source and to provide an isothermal environment to the plurality of optical components and/or within the isothermal enclosure.

In some implementations, the plurality of heating and cooling elements may provide an isothermal environment to the plurality of optical components and/or within the isothermal enclosure such that the isothermal environment includes temperature gradients satisfying a threshold. For example, the isothermal environment may include temperature gradients of ±~20° C. when ambient temperatures change from about −40° C. to about 100° C.

In some implementations, the plurality of heating and cooling elements may provide an isothermal environment to a particular component of the plurality of optical components such that the isothermal environment includes temperature gradients satisfying a threshold. For example, the isothermal environment for a laser source may include temperature gradients of ±~2° C. when ambient temperatures change from about −40° C. to about 100° C.

In some implementations, and as shown in FIG. 3, the plurality of heating and cooling elements may include two pairs of heating elements and cooling elements, where each pair includes a heating element and a cooling element positioned adjacent to each other. Although two pairs of heating elements and cooling elements are shown in FIG. 3, the optical device 300 may include any number of pairs of heating elements and cooling elements, such as three, four, five, six, ten, and/or the like. Additionally, or alternatively, the optical device 300 may include only cooling elements and no heating elements, or only heating elements and no cooling elements. In some implementations, the optical device 300 may include heating and/or cooling elements such as a resistive heater, a thermo-electric cooler (TEC) device (e.g., including Peltier elements and/or the like), a heatsink, a liquid cooling mechanism (e.g., with or without pumps), a forced air-cooling mechanism, and/or the like.

In some implementations, the optical device 300 may include heating and/or cooling elements having parameters (e.g., number, size, location, aspect ratio, pitch, and/or the like) and positioned within and/or on the isothermal enclosure based on a thermal modeling process. For example, the thermal modeling process may include identifying thermally critical optical components, identifying thermal requirements of the thermally critical optical components (e.g., a set temperature, a tolerable variation from the set temperature, and/or the like), determining, based on a range of ambient temperatures of operation and use of the optical device 300 (e.g., lidar and/or the like), whether only heating elements, only cooling elements, or both heating elements and cooling elements may provide the isothermal environment, and determining, based on thermal modeling of the optical device 300, parameters for the heating and/or cooling elements.

For example, the optical device 300 may include one or more TECs having sizes, shapes, pitches, and/or positions within the optical device 300 selected to transfer, from a portion of the isothermal enclosure containing a laser source, heat to maintain a temperature in the portion of the isothermal enclosure containing the laser source within the tolerable variation from the set temperature of the laser source, in the range of ambient temperatures of operation and use of the optical device 300. In some implementations, the optical device 300 may maintain a temperature in the portion of the isothermal enclosure containing the laser source within a temperature range (e.g., between about 25° C. and about 45° C. and/or the like).

In another example, the optical device 300 may include one or more TECs having sizes, shapes, pitches, and/or positions within the optical device 300 selected to maintain, in the portion of the isothermal enclosure containing the optical components, a temperature that satisfies a threshold. In some implementations, a temperature of between about 25° C. and about 45° C. may satisfy the threshold.

In yet another example, the optical device 300 may include one or more TECs having sizes, shapes, pitches, and/or positions within the optical device 300 selected to maintain, in the portion of the isothermal enclosure containing the optical components, an isothermal environment having temperature gradients that satisfy a threshold. In some implementations, the threshold may be based on optical sensitivities of the optical components, a temperature coefficient of refractive index (dn/dt) of a material of the optical aperture, and/or the like. In some implementations, a temperature gradient of ±10-20° C. for an ambient temperature of −40° C. to 85° C. may satisfy the threshold. In some implementations, a temperature gradient of ±5° C. for an ambient temperature of −40° C. to 85° C. may satisfy the threshold.

Figure 4:
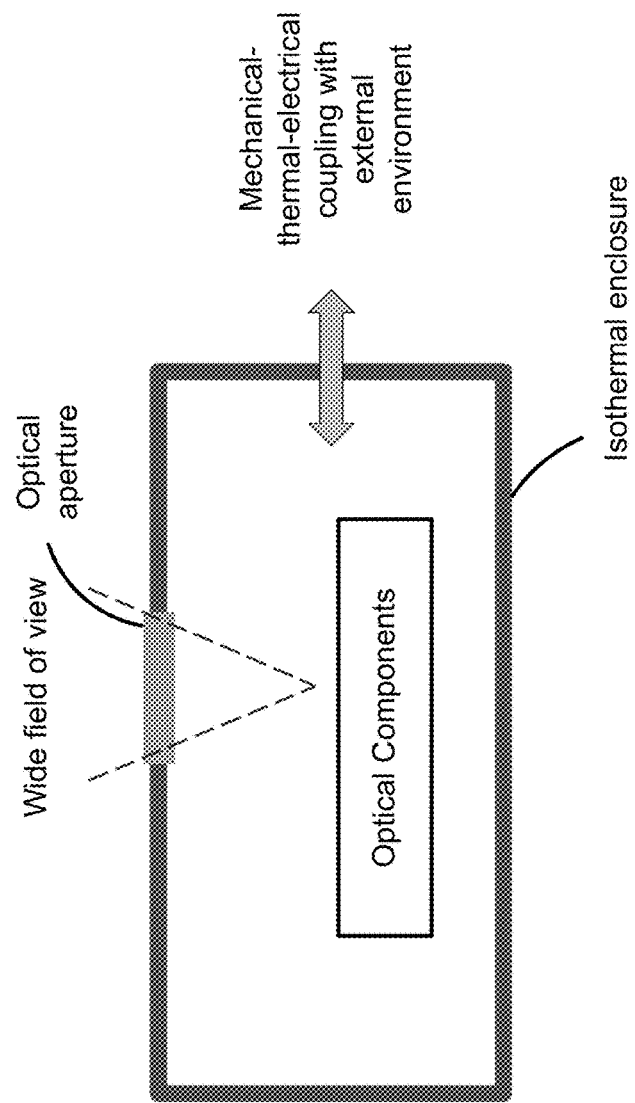

FIG. 4 is a diagram of an example optical device 400 including an isothermal enclosure as described herein. As shown in FIG. 4, the optical device 400 may include an isothermal enclosure including an optical aperture, and optical components positioned within the isothermal enclosure.

In some implementations, the optical device 400 may include an isothermal enclosure such as the isothermal enclosure of the optical device 300 of FIG. 3. In some implementations, the optical device 400 may include an optical aperture such as the optical aperture of the optical device 300 of FIG. 3. In some implementations, the optical device 400 may include optical components such as the optical components of the optical device 300 of FIG. 3. In some implementations, the optical device 400 may include one or more heating and/or cooling elements such as the plurality of heating and cooling elements of the optical device 300 of FIG. 3.

As shown in FIG. 4, the isothermal enclosure may serve as a mechanical, thermal, and/or electrical coupling with the external environment. For example, the isothermal enclosure may mechanically couple to another component, such as a package for an optics block and/or the like, within the optical device 400. In some implementations, the isothermal enclosure may thermally couple to the environment around the isothermal enclosure (e.g., gas, air, and/or the like within the optical device 400), another component (e.g., a heat sink, a heating element, a cooling element, and/or the like) within the optical device 400, and/or the like. In some implementations, the isothermal enclosure may electrically couple (e.g., via wired connections for a laser source, a scanning component, another optical component, and/or the like) to the external environment, another component within the optical device 400, and/or the like.

As shown in FIG. 4, the optical aperture provides the optical components within the isothermal enclosure with a wide field of view of the external environment (e.g., an environment external to the isothermal enclosure). For example, the optical components may include a laser component to emit an optical beam and a scanning component to scan the wide field of view with the optical beam through the optical aperture. In this way, the optical device 400 may include an isothermal enclosure that permits the optical components within the isothermal enclosure to optically communicate (e.g., emit and/or receive light) with the external environment and mechanically, thermally, and/or electrically couple with the external environment.

Figure 5:
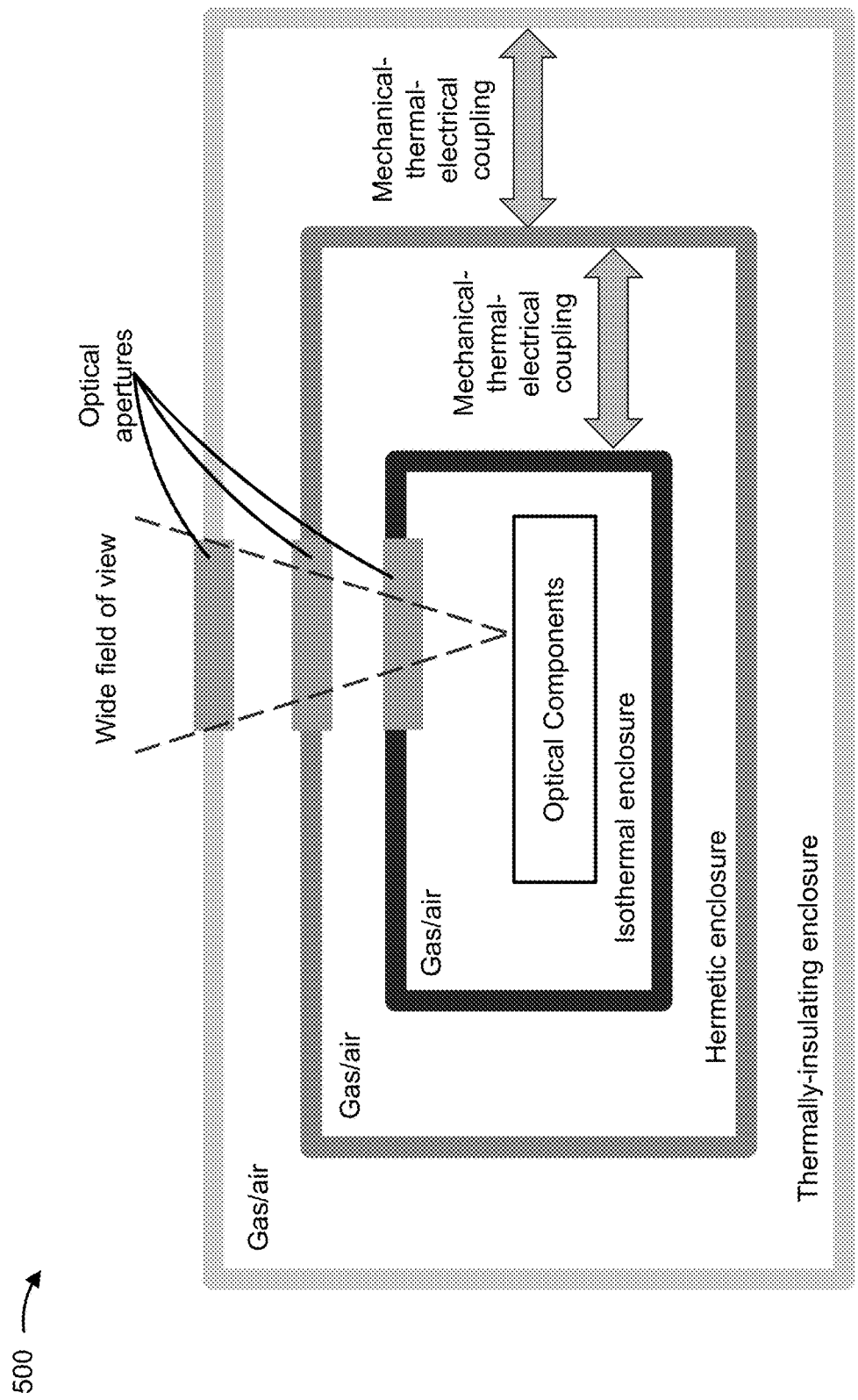
FIGS. 5-7 are diagrams of one or more example optical devices including multiple enclosures as described herein.

FIG. 5 is a diagram of an example optical device 500 including multiple enclosures as described herein. As shown in FIG. 5, the optical device 500 may include a thermally-insulating enclosure, a hermetic enclosure positioned within the thermally-insulating enclosure, an isothermal enclosure positioned within the hermetic enclosure, optical components positioned within the isothermal enclosure, and optical apertures within each of the thermally-insulating enclosure, the hermetic enclosure, and the isothermal enclosure.

In some implementations, the optical device 500 may include an isothermal enclosure such as the isothermal enclosure of the optical device 300 of FIG. 3. In some implementations, the optical device 500 may include optical apertures such as the optical aperture of the optical device 300 of FIG. 3. In some implementations, the optical device 500 may include optical components such as the optical components of the optical device 300 of FIG. 3. In some implementations, the optical device 500 may include one or more heating and/or cooling elements such as the plurality of heating and cooling elements of the optical device 300 of FIG. 3.

As shown in FIG. 5, the optical components are positioned within the isothermal enclosure. In some implementations, positioning the optical components within the isothermal enclosure (e.g., instead of within the hermetic enclosure) may conserve power used by heating and/or cooling elements to provide the isothermal environment to the optical components that would otherwise be consumed by positioning the optical components within another enclosure (e.g., the hermetic enclosure) that is positioned within the isothermal enclosure.

As shown in FIG. 5, the optical apertures provide the optical components within the isothermal enclosure with a wide field of view of the external environment (e.g., an environment external to the isothermal enclosure, the hermetic enclosure, and the thermally-insulating enclosure). For example, the optical components may include a laser component to emit an optical beam and a scanning component to scan the wide field of view with the optical beam through the optical apertures. As shown in FIG. 5, the isothermal enclosure may be filled with gas and/or air surrounding the optical components.

Although FIG. 5 shows optical apertures having a same size, in some implementations, the optical device 500 may include optical apertures having different sizes. For example, a first optical aperture in the isothermal enclosure may be smaller than a second optical aperture in the hermetic enclosure, which may be smaller than a third optical aperture in the thermally-insulating enclosure. By varying the size of the optical apertures, the optical device 500 may maintain the wide field of view and reduce the size of the optical aperture in the isothermal enclosure, which may reduce the temperature gradient produced by the optical aperture.

As shown in FIG. 5, the isothermal enclosure may be positioned within the hermetic enclosure. For example, and as shown in FIG. 5, the hermetic enclosure may be filled with gas and/or air surrounding the isothermal enclosure.

Furthermore, the isothermal enclosure and the hermetic enclosure may be mechanically, thermally, and electrically coupled. In some implementations, a mechanical coupling may include isolation mounts, soft mounts, hard mounts, hard/soft epoxy, rubber-like materials, and/or the like. In some implementations, an electrical coupling may include wire bonds, glass-to-metal-sealed electrical connectors, cofired ceramic devices, and/or the like.

In some implementations, the hermetic enclosure may prevent the passage of air, oxygen, other gases, and/or the like from outside of the hermetic enclosure to inside of the hermetic enclosure and vice versa. For example, the hermetic enclosure may prevent gases and/or dust from affecting the optical components or the performance of the optical components. In some implementations, the hermetic enclosure may be made of a material such as aluminum, ceramic, polymers (e.g., a liquid-crystal polymer (LPC) and/or the like), a nickel-cobalt ferrous alloy (e.g., Kovar and/or the like), stainless steel, and/or the like.

As shown in FIG. 5, the hermetic enclosure may be positioned within the thermally-insulating enclosure. For example, and as shown in FIG. 5, the thermally-insulating enclosure may be filled with gas and/or air surrounding the hermetic enclosure. Furthermore, the hermetic enclosure and the thermally-insulating enclosure may be mechanically, thermally, and electrically coupled. In some implementations, a mechanical coupling may include isolation mounts, soft mounts, hard mounts, hard/soft epoxy, rubber-like materials, and/or the like. In some implementations, an electrical coupling may include wire bonds, glass-to-metal-sealed electrical connectors, cofired ceramic devices, and/or the like.

In some implementations, the thermally-insulating enclosure thermally insulates the hermetic enclosure and the isothermal enclosure from an external environment, such as an interior or exterior of the optical device 500. In some implementations, the thermally-insulating enclosure may be made of a material having a low thermal conductivity, such as plastic, other polymers, and/or the like. In some implementations, the thermally-insulating enclosure may include multiple layers of material with insulative materials (e.g., materials having low thermal conductivity) between the layers. For example, the thermally-insulating enclosure may include an inner stainless-steel wall and an outer stainless steel wall with an insulative material (e.g., a gas, a liquid, and/or the like) or a vacuum between the inner and outer walls, where the combination of the inner wall, outer wall, and insulative material or vacuum have low thermal conductivity.

In some implementations, the optical device 500 may include an isothermal enclosure that is also hermetically sealed. For example, the isothermal enclosure may be hermetically sealed and positioned within the thermally-insulating enclosure, which may conserve space, financial resources, and/or the like otherwise consumed by including a separate hermetic enclosure. In some implementations, the isothermal enclosure may be hermetically sealed by joining, sealing, soldering, epoxying, and/or the like one or more walls of the isothermal enclosure to one or more other walls of the isothermal enclosure.

In some implementations, the optical device 500 may include a thermally-insulating enclosure that is also hermetically sealed. For example, the thermally-insulating enclosure may be hermetically sealed, and the isothermal enclosure may be positioned within the thermally-insulating enclosure, which may conserve space, financial resources, and/or the like otherwise consumed by including a separate hermetic enclosure.

In this way, the optical device 500 may provide an isothermal, hermetically sealed, and thermally insulated environment to the optical components, while permitting the optical components to optically communicate with the external environment.

Figure 6:
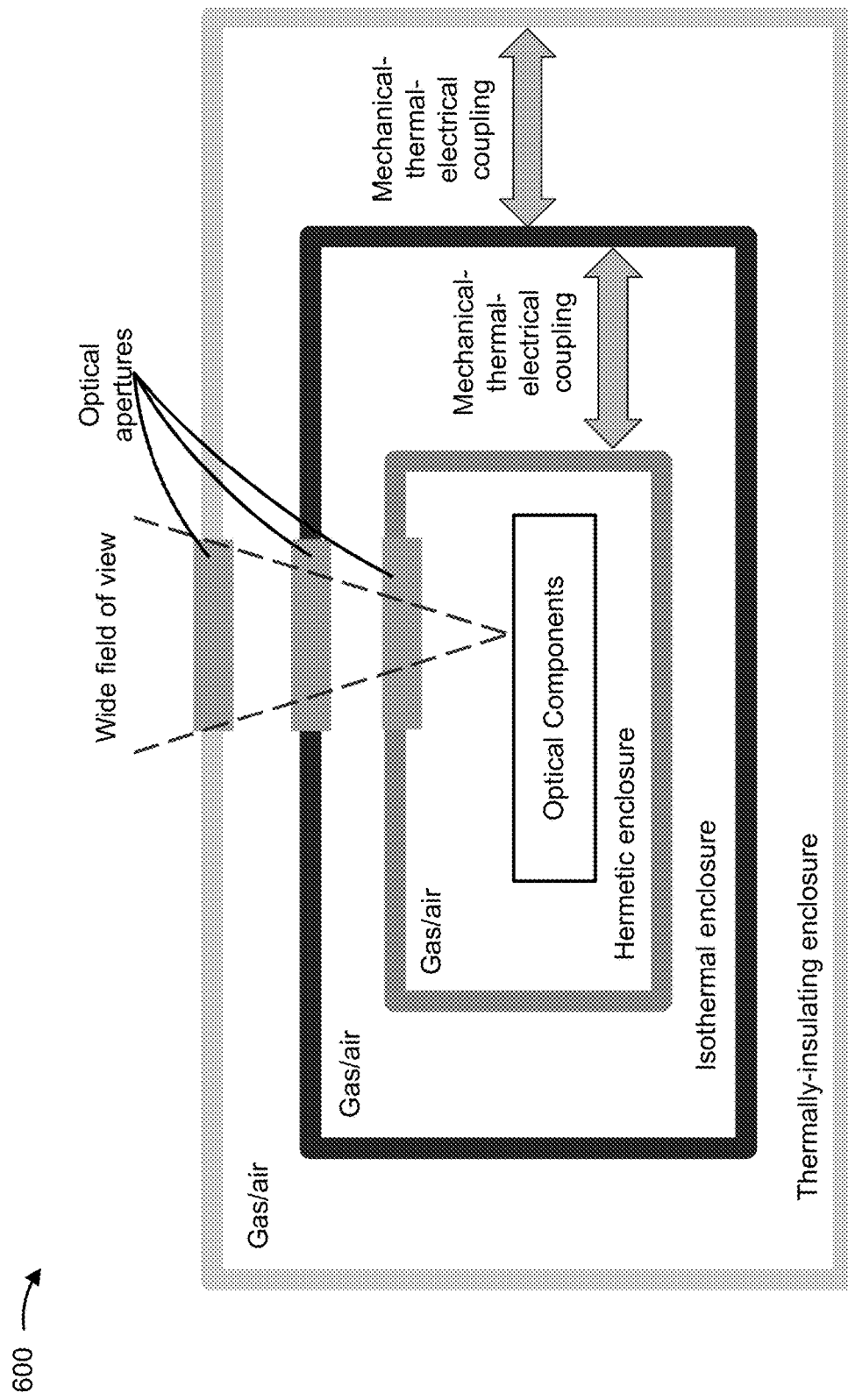

FIG. 6 is a diagram of an example optical device 600 including multiple enclosures as described herein. As shown in FIG. 6, the optical device 600 may include a thermally-insulating enclosure, an isothermal enclosure positioned within the thermally-insulating enclosure, a hermetic enclosure positioned within the isothermal enclosure, optical components positioned within the hermetic enclosure, and optical apertures within each of the thermally-insulating enclosure, the isothermal enclosure, and the hermetic enclosure.

In some implementations, the optical device 600 may include a hermetic enclosure such as the hermetic enclosure of the optical device 500 of FIG. 5. In some implementations, the optical device 600 may include optical apertures such as the optical aperture of the optical device 300 of FIG. 3. In some implementations, the optical device 600 may include optical components such as the optical components of the optical device 300 of FIG. 3. In some implementations, the optical device 600 may include one or more heating and/or cooling elements such as the plurality of heating and cooling elements of the optical device 300 of FIG. 3.

As shown in FIG. 6, the optical components are positioned within the hermetic enclosure. In some implementations, positioning the optical components within the hermetic enclosure (e.g., instead of within the isothermal enclosure) may reduce the size of the enclosure to hermetically seal thereby conserving financial resources that would otherwise be consumed by positioning the optical components within another enclosure (e.g., the isothermal enclosure) an positioned the other enclosure within the hermetic enclosure.

As shown in FIG. 6, the optical apertures provide the optical components within the hermetic enclosure with a wide field of view of the external environment (e.g., an environment external to the hermetic enclosure, the isothermal enclosure, and the thermally-insulating enclosure). For example, the optical components may include a laser component to emit an optical beam and a scanning component to scan the wide field of view with the optical beam through the optical apertures. As shown in FIG. 6, the hermetic enclosure may be filled with gas and/or air surrounding the optical components.

As shown in FIG. 6, the hermetic enclosure may be positioned within the isothermal enclosure. For example, and as shown in FIG. 6, the isothermal enclosure may be filled with gas and/or air surrounding the hermetic enclosure. Furthermore, the hermetic enclosure and the isothermal enclosure may be mechanically, thermally, and electrically coupled. In some implementations, a mechanical coupling may include isolation mounts, soft mounts, hard mounts, hard/soft epoxy, rubber-like materials, and/or the like. In some implementations, an electrical coupling may include wire bonds, glass-to-metal-sealed electrical connectors, cofired ceramic devices, and/or the like. In some implementations, the optical device 600 may include an isothermal enclosure such as the isothermal enclosure of the optical device 300 of FIG. 3.

As shown in FIG. 6, the isothermal enclosure may be positioned within the thermally-insulating enclosure. For example, and as shown in FIG. 6, the thermally-insulating enclosure may be filled with gas and/or air surrounding the isothermal enclosure. Furthermore, the isothermal enclosure and the thermally-insulating enclosure may be mechanically, thermally, and electrically coupled. In some implementations, a mechanical coupling may include isolation mounts, soft mounts, hard mounts, hard/soft epoxy, rubber-like materials, and/or the like. In some implementations, an electrical coupling may include wire bonds, glass-to-metal-sealed electrical connectors, cofired ceramic devices, and/or the like. In some implementations, the optical device 600 may include a thermally-insulating enclosure such as the thermally-insulating enclosure of the optical device 500 of FIG. 5.

In some implementations, the optical device 600 may include an isothermal enclosure that is also hermetically sealed. For example, the isothermal enclosure may be hermetically sealed and positioned within the thermally-insulating enclosure, which may conserve space, financial resources, and/or the like otherwise consumed by including a separate hermetic enclosure.

In some implementations, the optical device 600 may include a thermally-insulating enclosure that is also hermetically sealed. For example, the thermally-insulating enclosure may be hermetically sealed, and the isothermal enclosure may be positioned within the thermally-insulating enclosure, which may conserve space, financial resources, and/or the like otherwise consumed by including a separate hermetic enclosure.

In this way, the optical device 600 may provide an isothermal, hermetically sealed, and thermally insulated environment to the optical components, while permitting the optical components to optically communicate with the external environment.

Figure 7:
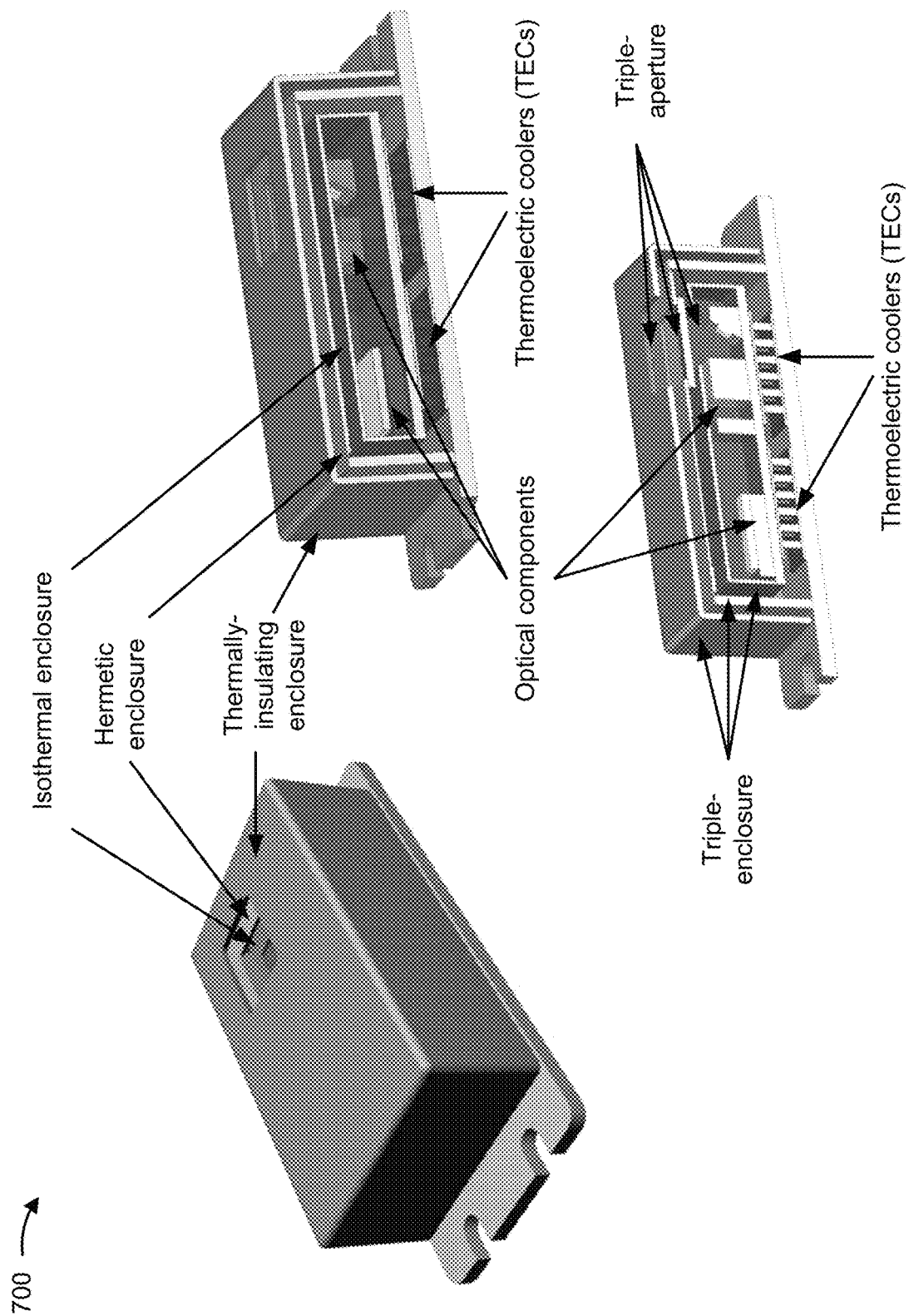

FIG. 7 is a diagram of an example optical device 700 including multiple enclosures as described herein. As shown in FIG. 7, the optical device 700 may include a thermally-insulating enclosure, a hermetic enclosure positioned within the thermally-insulating enclosure, an isothermal enclosure positioned within the hermetic enclosure, thermoelectric coolers (TECs) positioned within the hermetic enclosure, optical components positioned within the isothermal enclosure, and apertures within each of the thermally-insulating enclosure, the isothermal enclosure, and the hermetic enclosure.

As shown in the upper left image of FIG. 7, the optical device 700 may include the thermally-insulating enclosure, the hermetic enclosure positioned within the thermally-insulating enclosure, and the isothermal enclosure positioned within hermetic enclosure. Each of the thermally-insulating enclosure, the isothermal enclosure, and the hermetic enclosure may include an aperture, and the apertures may align with each other.

As shown in the upper right, cross-section image of FIG. 7, the optical device 700 may include optical components positioned within the isothermal enclosure such that the optical components may optically communicate with an external environment through the apertures. In some implementations, the optical components on the left side of the upper right cross-section image of FIG. 7 may include a laser component to emit an optical beam, and the optical components on the right side of the upper right cross-section image of FIG. 7 may include a scanning component to scan a field of view with the optical beam through the apertures.

As shown in the upper right, cross-section image of FIG. 7, the optical device 700 may include TECs positioned within the hermetic enclosure and under the locations of the optical components in the isothermal enclosure. In some implementations, the TECs may be thermally coupled to and/or positioned on an exterior surface of the isothermal enclosure at exterior locations corresponding to interior locations of optical components on the interior of the isothermal enclosure. For example, and as shown, a first TEC may be positioned on the left side under the laser component to provide an isothermal environment to the laser component, and a second TEC may be positioned on the right side under the other optical components including the scanning component to provide an isothermal environment to the other optical components including the scanning component. Additionally, or alternatively, the second TEC may be thermally coupled to and/or positioned on the exterior surface of the isothermal enclosure at an exterior location corresponding to an axis defined by the apertures. In some implementations, the optical device 700 may separately control the first TEC and the second TEC (e.g., by applying a first current to the first TEC and applying a second current to the second TEC and/or the like) to provide the isothermal environments to the optical components.

As shown in the lower right, cross-section image of FIG. 7, the optical device 700 may include a triple-enclosure formed by the isothermal enclosure, the hermetic enclosure, and the thermally-insulating enclosure. In some implementations, the optical device 700 may include a triple-aperture formed by the apertures in the isothermal enclosure, the hermetic enclosure, and the thermally-insulating enclosure.

Figure 8A:
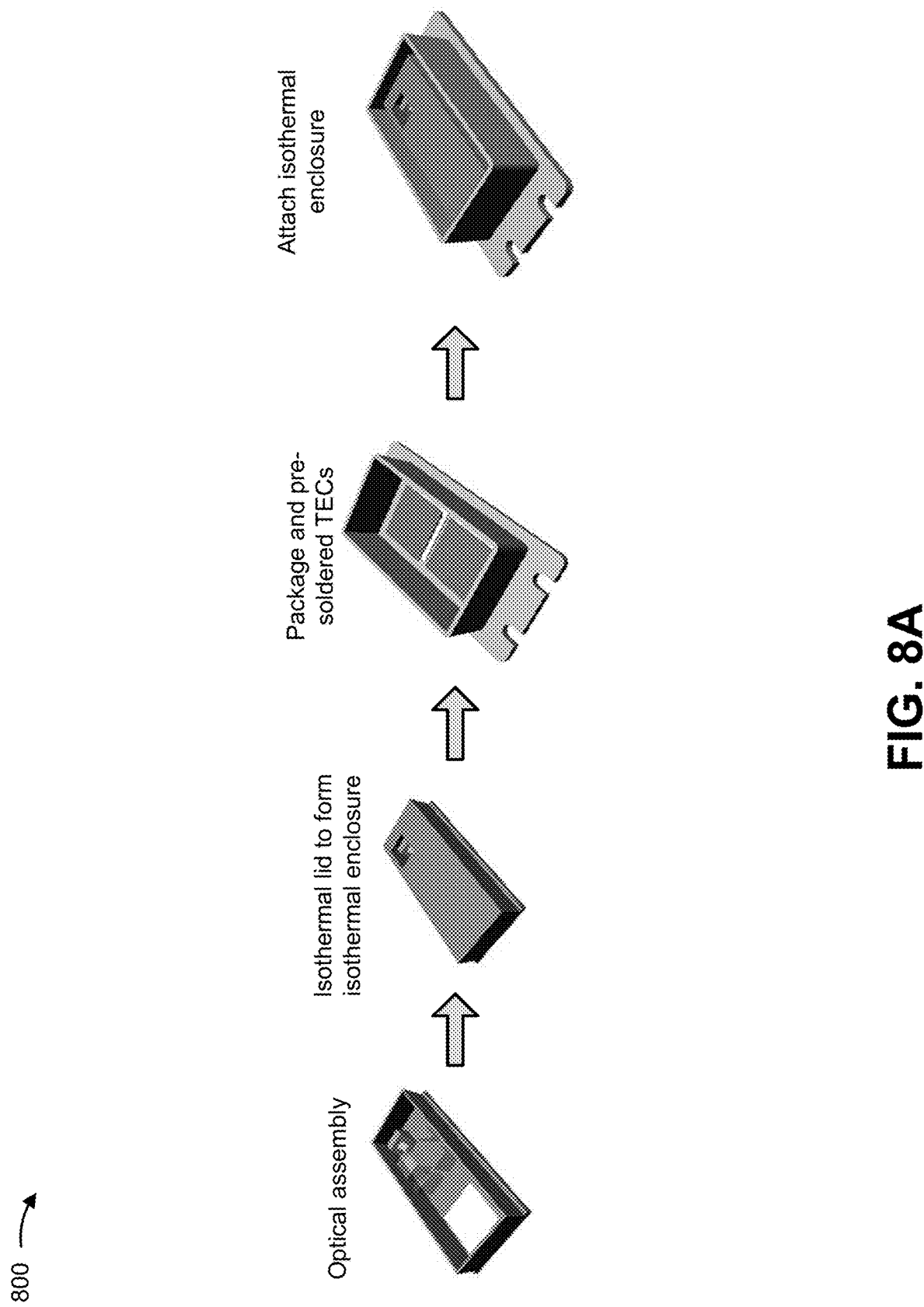
FIGS. 8A-8B are diagrams of an example assembly process for an optical device including multiple enclosures as described herein.
Figure 8B:
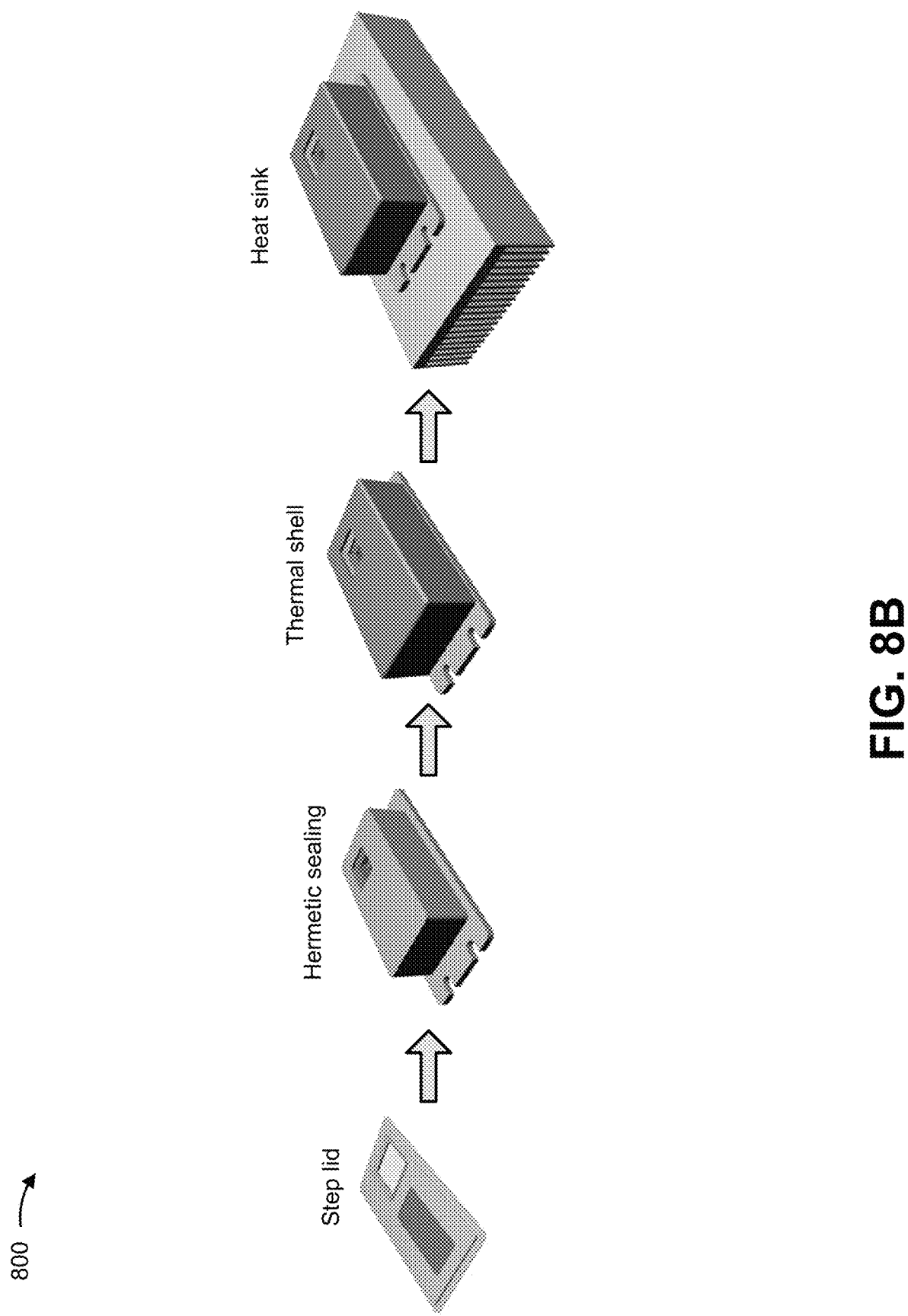

FIGS. 8A-8B are diagrams of an example assembly process 800 for an optical device including multiple enclosures as described herein. As shown in FIG. 8A, the assembly process 800 may begin with an optical assembly. In some implementations, the optical assembly may include an optomechanical bench having a bottom wall and side walls extending vertically upward from the bottom wall. In some implementations, the optomechanical bench may maintain positioning of optical components, such as a laser component, one or more lenses, one or more mirrors, a scanning component, and/or the like.

As shown in FIG. 8A, the assembly process 800 may include placing an isothermal lid (e.g., including an aperture) on top of the side walls of the optical assembly to enclose the optical components. In some implementations, the optical assembly and the isothermal lid may form an isothermal enclosure as described herein.

As shown in FIG. 8A, the assembly process 800 may include providing a package and pre-soldered TECs. In some implementations, the TECs may be soldered to a bottom wall of the package, and the package may include side walls extending vertically upward from the bottom wall. In some implementations, the package may include mechanical connections to mechanically couple the package to an optical device. In some implementations, a mechanical coupling may include isolation mounts, soft mounts, hard mounts, hard/soft epoxy, rubber-like materials, and/or the like.

As shown in FIG. 8A, the assembly process 800 may include attaching the isothermal enclosure (e.g., formed by the optical assembly and the isothermal lid) to the package. For example, and as shown in FIG. 8A, the assembly process 800 may include mechanically attaching the isothermal enclosure to the package by positioning the isothermal enclosure on top of the TECs within the vertically extending side walls. In some implementations, a mechanical coupling may include isolation mounts, soft mounts, hard mounts, hard/soft epoxy, rubber-like materials, and/or the like. In some implementations, the assembly process 800 may include electrically coupling the optical components within the isothermal enclosure to the package. In some implementations, an electrical coupling may include wire bonds, glass-to-metal-sealed electrical connectors, cofired ceramic devices, and/or the like.

As shown in FIG. 8B, the assembly process 800 may include providing a step lid. For example, the step lid may include an aperture (e.g., a glass window and/or the like) to permit the optical components to optically communicate with an external environment and a moisture absorber to absorb moisture that may condense on the step lid. In some implementations, and as shown in FIG. 8B, the step lid may include an outer edge that is thinner than an inner portion of the step lid such that when the step lid is placed on top of the vertically extending side walls of the package the step lid forms a mechanical seal.

As shown in FIG. 8B, the assembly process 800 may include placing the step lid on top of the vertically extending side walls of the package and hermetically sealing the package and the step lid. For example, the assembly process 800 may include hermetically sealing seams between the vertically extending side walls of the package and the step lid, seams between the vertically extending side walls of the package and the bottom wall of the package, and/or the like. In some implementations, the package and the step lid may form a hermetic enclosure as described herein.

As shown in FIG. 8B, the assembly process 800 may include positioning a thermal shell over the hermetic enclosure (e.g., the package and the step lid). In some implementations, the thermal shell may include an upper wall (e.g., including an aperture) and side walls extending vertically downward from the upper wall. In some implementations, the assembly process 800 may include joining, sealing, soldering, epoxying, and/or the like, the side walls of the thermal shell to the bottom wall of the package. In some implementations, the thermal shell and the bottom wall of the package may form a thermally-insulating enclosure as described herein.

As shown in FIG. 8B, the assembly process 800 may include positioning the thermally-insulating enclosure on a heat sink. In some implementations, the bottom wall of the package may thermally couple the heat sink to the TECs such that the TECs may transfer heat from the isothermal enclosure to the heat sink to provide the isothermal environment to the optical components.

Figure 9:
FIGS. 9-12 are diagrams of temperature gradients on an example optical device including multiple enclosures as described herein.

FIG. 9 is a diagram of temperature gradients on an example optical device 900 including multiple enclosures as described herein. As shown in FIG. 9, the optical device 900 may include an outer enclosure and a heat sink. Although not shown in FIG. 9, the optical device 900 may include a thermally-insulating enclosure as the outer enclosure, a hermetic enclosure positioned within the thermally-insulating enclosure, an isothermal enclosure and two TECs positioned within the hermetic enclosure, optical components positioned within the isothermal enclosure, and optical apertures within each of the thermally-insulating enclosure, the hermetic enclosure, and the isothermal enclosure. In the diagrams of FIGS. 9-12, the optical device 900 is in an ambient temperature of 105° C., an active thermal load on a laser component of the optical components is 1 W, the TECs include 17 couples each, about 10 W of total power is being applied to each TEC, and a current of 4.45 amps is being applied to each TEC.

As shown in FIG. 9, the temperature on the exterior of the optical device 900 ranges from 110.1° C. and 110.5° C. on portions of the heat sink, to 108.3° C. on a side wall of the thermally-insulating enclosure, to 102° C. on a central area of a top surface of the thermally-insulating enclosure, to about 100° C. near the aperture.

Figure 10:

FIG. 10 is a diagram of temperature gradients on the example optical device 900 with the thermally-insulating enclosure not shown, an upper wall (e.g., a step lid) of the hermetic enclosure not shown, and an upper wall (e.g., an isothermal lid) of the isothermal enclosure not shown, such that the interior of the isothermal enclosure and the optical components are shown. As shown in FIG. 10, the temperature on the heat sink is 110.51° C., and the temperature on the optical components ranges from 36.073° C. (e.g., near the laser component) to 34.455° C. Thus, FIG. 10 shows that the thermally-insulating enclosure, the hermetic enclosure, the TECs, and the isothermal enclosure may maintain a large temperature difference between the exterior and interior of the optical device 900.

Figure 11:
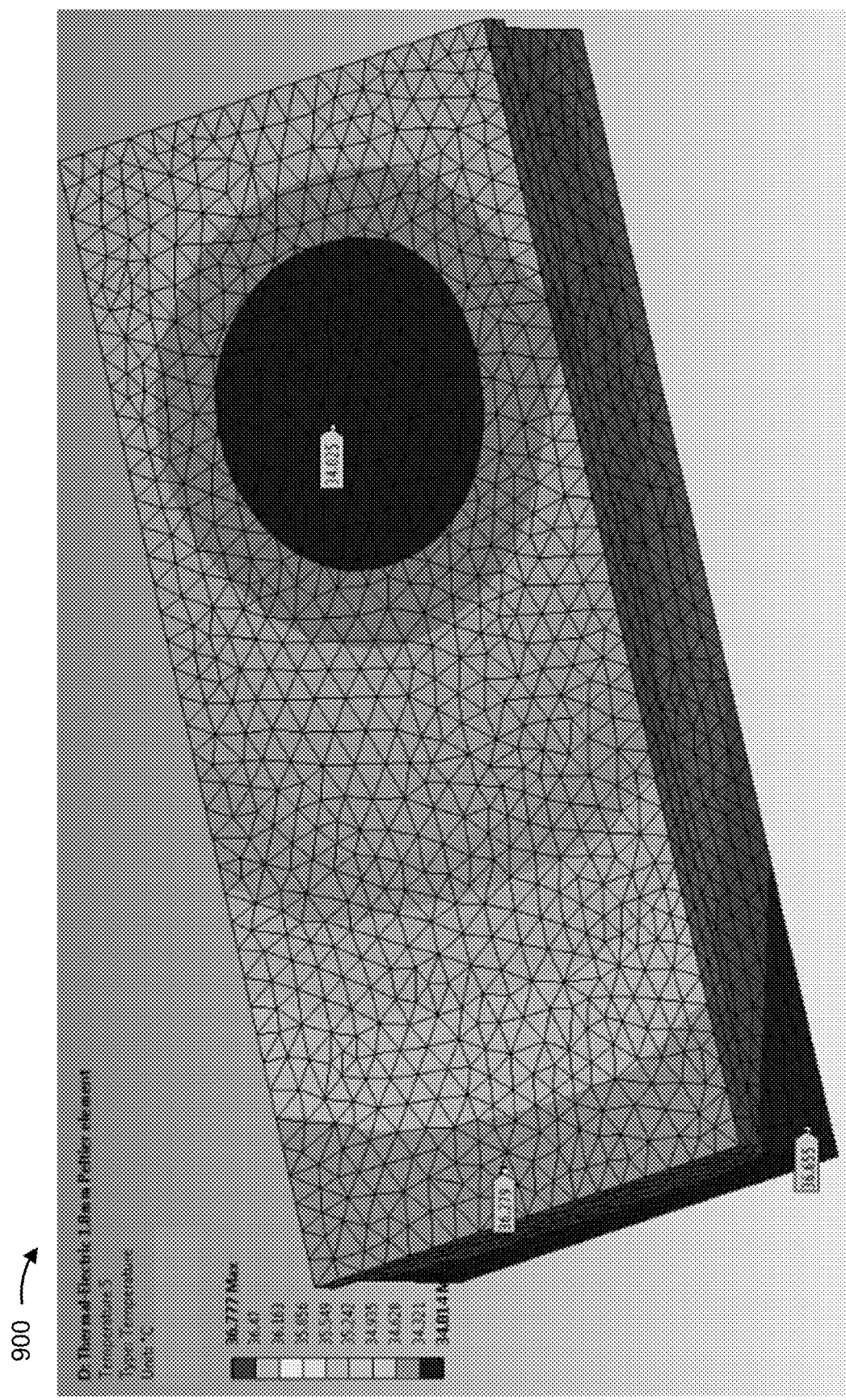

FIG. 11 is a diagram of temperature gradients on the example optical device 900 with the heatsink not shown, the thermally-insulating enclosure not shown, the hermetic enclosure not shown, and such that an exterior of the isothermal enclosure is shown. As shown in FIG. 11, the temperature on the exterior of the isothermal enclosure ranges from 36.655° C. on a side wall of the isothermal enclosure (e.g., near the laser component), to 36.279° C. on the upper wall (e.g., the isothermal lid) of the isothermal enclosure, to 34.025° C. near the aperture. Thus, FIG. 11 shows that the thermally-insulating enclosure, the hermetic enclosure, the TECs, and the isothermal enclosure may provide an isothermal environment (e.g., a relatively uniform temperature gradient) on the exterior of the isothermal enclosure of the optical device 900.

Figure 12:
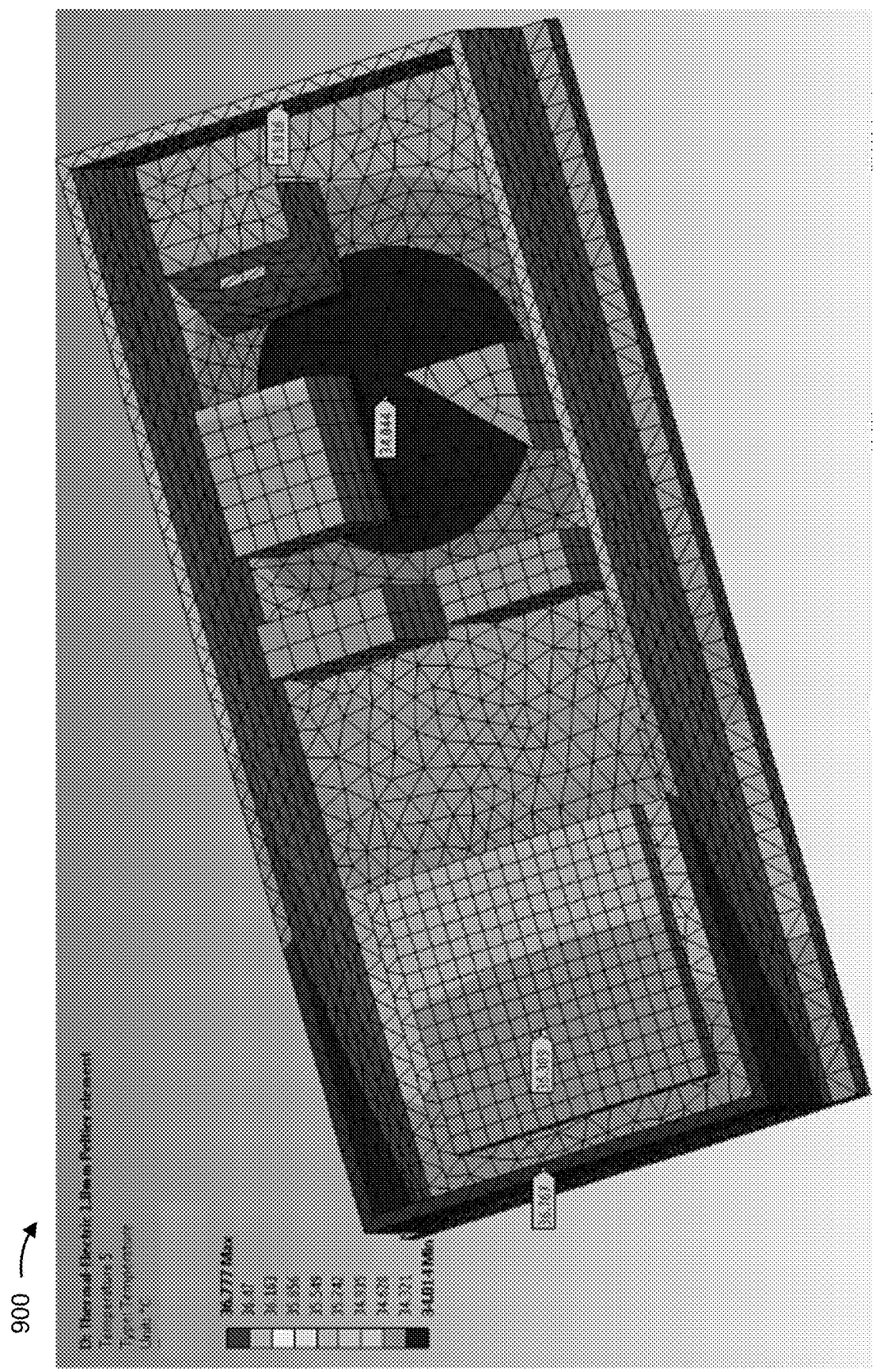

FIG. 12 is a diagram of temperature gradients on the example optical device 900 with the heatsink not shown, the thermally-insulating enclosure not shown, the hermetic enclosure not shown, and the upper wall (e.g., the isothermal lid) of the isothermal enclosure not shown, such that an interior of the isothermal enclosure is shown. As shown in FIG. 12, the temperature ranges from 36.767° C. on a side wall of the isothermal enclosure (e.g., near the laser component), to 36.309° C. on a surface of the laser component, to 35.816° C. on another side wall of the isothermal enclosure (e.g., near the scanning component), to 34.044° C. near the aperture. Thus, FIG. 12 shows that the thermally-insulating enclosure, the hermetic enclosure, the TECs, and the isothermal enclosure may provide an isothermal environment (e.g., a relatively uniform temperature gradient) on the interior of the isothermal enclosure of the optical device 900.

As indicated above, FIGS. 1-7, 8A, 8B, and 9-12 are provided merely as one or more examples. Other examples may differ from what is described with regard to FIGS. 1-7, 8A, 8B, and 9-12. The number and arrangement of components shown in FIGS. 1-7, 8A, 8B, and 9-12 are provided as one or more examples. In practice, there may be additional components, fewer components, different components, or differently arranged components than those shown in FIGS. 1-7, 8A, 8B, and 9-12. Furthermore, two or more components shown in FIGS. 1-7, 8A, 8B, and 9-12 may be implemented within a single component, or a single component shown in FIGS. 1-7, 8A, 8B, and 9-12 may be implemented as multiple, distributed components. Additionally, or alternatively, a set of components (e.g., one or more components) of optical device 100, optical device 200, optical device 300, optical device 400, optical device 500, optical device 600, optical device 700, and optical device 900 may perform one or more functions described as being performed by another set of components.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical device, comprising:
    a first enclosure including a first optical aperture;
    a plurality of optical components positioned within the first enclosure, wherein the plurality of optical components include a laser component;
    a second enclosure including a second optical aperture, wherein the first enclosure is positioned within the second enclosure, and
    wherein:
        the first enclosure is an isothermal enclosure and the second enclosure is a hermetically-sealed enclosure, or
        the first enclosure is the hermetically-sealed enclosure and the second enclosure is the isothermal enclosure;
    at least one heating element or cooling element to provide an isothermal environment to the plurality of optical components,
        wherein the at least one heating element or cooling element is thermally coupled with the isothermal enclosure,
        wherein the at least one heating element or cooling element is positioned on an exterior surface of the isothermal enclosure at an exterior location corresponding to an interior location at which the laser component is positioned; and
    a thermally-insulating enclosure including a third optical aperture,
        wherein the first enclosure and the second enclosure are positioned within the thermally-insulating enclosure; and
    wherein the plurality of optical components are to emit and/or receive light through the first optical aperture, the second optical aperture, and the third optical aperture.

2. The optical device of claim 1, wherein the plurality of optical components include a laser component to emit an optical beam and a scanning component to scan a field of view with the optical beam through the first optical aperture, the second optical aperture, and the third optical aperture.

3. The optical device of claim 1, wherein the first optical aperture has a lower thermal conductivity than the first enclosure.

4. The optical device of claim 1, wherein the at least one heating element or cooling element includes a thermoelectric cooler.

5. The optical device of claim 1, wherein a second heating element or cooling element is positioned on an exterior surface of the isothermal enclosure at an exterior location, the exterior location corresponding to an axis defined by the first optical aperture, the second optical aperture, and the third optical aperture.

6. The optical device of claim 1, wherein the hermetically-sealed enclosure is mechanically and electrically coupled to the thermally-insulating enclosure.

7. An optical device, comprising:
    a hermetically-sealed enclosure including a first optical aperture;
    a thermally-insulating enclosure including a second optical aperture, wherein the thermally-insulating enclosure is positioned within the hermetically-sealed enclosure;
    a plurality of optical components positioned within the hermetically-sealed enclosure,
        wherein the plurality of optical components include a laser component to emit an optical beam and a scanning component to scan a field of view with the optical beam through the first optical aperture and the second optical aperture; and
    at least one heating element or cooling element to provide an isothermal environment to the plurality of optical components,
        wherein the at least one heating element or cooling element is positioned within the hermetically-sealed enclosure.

8. The optical device of claim 7, wherein the hermetically-sealed enclosure includes an optomechanical bench and a lid, and
    wherein the first optical aperture is positioned in the lid.

9. The optical device of claim 7, wherein the first optical aperture has a lower thermal conductivity than the hermetically-sealed enclosure.

10. The optical device of claim 7, wherein the at least one heating element or cooling element includes a −5-hermos-electric cooler.

11. The optical device of claim 7, wherein the hermetically-sealed enclosure is mechanically and electrically coupled to the thermally-insulating enclosure.

12. An optical device, comprising:
- an isothermal enclosure including a first optical aperture;
- a hermetically-sealed enclosure including a second optical aperture,
  - wherein the isothermal enclosure is positioned within the hermetically-sealed enclosure;
- a thermally-insulating enclosure including a third optical aperture,
  - wherein the hermetically-sealed enclosure is positioned within the thermally-insulating enclosure;
- a plurality of optical components positioned within the isothermal enclosure,
  - wherein the plurality of optical components are to emit and/or receive light through the first optical aperture; and
- at least one heating element or cooling element to provide an isothermal environment to the plurality of optical components,
  - wherein the at least one heating element or cooling element is thermally coupled with the isothermal enclosure.

13. The optical device of claim 12, wherein the plurality of optical components include a laser component to emit an optical beam and a scanning component to scan a field of view with the optical beam through the first optical aperture.

14. The optical device of claim 13, wherein the at least one heating element or cooling element is positioned on an exterior surface of the isothermal enclosure at an exterior location corresponding to an interior location at which the laser component is positioned.

15. The optical device of claim 12, wherein the first optical aperture has a lower thermal conductivity than the isothermal enclosure.

16. The optical device of claim 12, wherein the at least one heating element or cooling element includes a −6-hermos-electric cooler.

17. The optical device of claim 12, wherein the hermetically-sealed enclosure has a lower thermal conductivity than the isothermal enclosure.

18. The optical device of claim 12, wherein the plurality of optical components include a laser component, and wherein the at least one heating element or cooling element is positioned on an exterior surface of the isothermal enclosure at an exterior location corresponding to an interior location at which the laser component is positioned.

19. The optical device of claim 12, wherein the at least one heating element or cooling element is positioned on an exterior surface of the isothermal enclosure.

20. The optical device of claim 12, wherein the at least one heating element or cooling element is positioned on an exterior surface of the isothermal enclosure at an exterior location, the exterior location corresponding to an axis defined by the first optical aperture, the second optical aperture, and the third optical aperture.

* * * * *

UNITED STATES PATENT AND TRADEMARK OFFICE
CERTIFICATE OF CORRECTION

| | |
|---|---|
| PATENT NO. | : 11,728,611 B2 |
| APPLICATION NO. | : 16/712493 |
| DATED | : August 15, 2023 |
| INVENTOR(S) | : Roozbeh Ahmadi et al. |

It is certified that error appears in the above-identified patent and that said Letters Patent is hereby corrected as shown below:

In the Claims

In Claim 10, Column 17, Line 2, "element includes a -5-hermos-electric cooler." should be changed to --element includes a thermo-electric cooler.--;

In Claim 16, Column 18, Line 9, "element includes a -6-hermos-electric cooler." should be changed to --element includes a thermo-electric cooler.--.

Signed and Sealed this
Twenty-seventh Day of February, 2024

Katherine Kelly Vidal
*Director of the United States Patent and Trademark Office*